United States Patent Office 2,859,223
Patented Nov. 4, 1958

2,859,223

$\Delta^{4,7}$-3,20-DIKETO-17-HYDROXY-11,21-BIS-OXYGENATED PREGNADIENES AND PROCESSES OF PREPARING THE SAME Lewis H. Sarett, Princeton, N. J., assignor to Merck & Co., Inc., Rahway, N. J., a corporation of New Jersey No Drawing. Original application January 25, 1955, Serial No. 483,858. Divided and this application October 31, 1955, Serial No. 544,075

17 Claims. (Cl. 260—397.45)

This invention is concerned generally with novel steroid compounds and processes of preparing them. More particularly, it relates to $\Delta^{4,7}$-3,20-diketo-17-hydroxy-11,21-bis-oxygenated-steroids of the pregnane series, and with processes of preparing them. These new $\Delta^{4,7}$-3,20-diketo-17-hydroxy-11,21-bis-oxygenated-steroids possess pharmacological activity similar to that shown by cortisone and are thus of value in the treatment of conditions which heretofore responded to the administration of the adrenal hormone, cortisone. Moreover, in addition to possessing cortisone-activity, these new $\Delta^{4,7}$-3,20-diketo-17-hydroxy-11,21-bis-oxygenated-steroids differ from cortisone in being relatively free from sodium or water retention action, and are thus especially effective in the treatment of arthritis and related diseases, producing their cortisone action without producing undesired metabolic effects such as edema.

This application is a division of application Serial No. 483,858, filed January 25, 1955.

These $\Delta^{4,7}$-3,20-diketo-17-hydroxy-11,21-bis-oxygenated-pregnadienes may be chemically represented as follows:

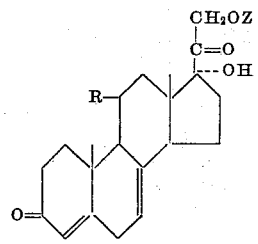

wherein R is a radical connected to C-11 by a carbon-oxygen linkage, and Z is hydrogen or an acyl radical.

These $\Delta^{4,7}$-3,20-diketo-17-hydroxy-11,21-bis-oxygenated-pregnadienes are prepared by reacting $\Delta^{4}$-3,11,20-triketo-17-hydroxy-21-acyloxy-pregnene with ethylene glycol to form $\Delta^{5}$-3-ethylenedioxy-11,20-diketo-17-hydroxy-pregnene which, upon reaction with bromsuccinimide, is converted to $\Delta^{5}$-3-ethylenedioxy-7-bromo-11,20-diketo-17-hydroxy-21-acyloxy-pregnene. This 7-bromo-derivative is reacted with a tertiary amine such as dimethylamine or collidine thereby forming $\Delta^{5,7}$-3-ethylenedioxy-11,20-diketo-17-hydroxy-21-acyloxy-pregnadiene which is converted, by reaction with an aqueous mineral acid in contact with a water-immiscible solvent such as chloroform, to $\Delta^{4,7}$-3,11,20-triketo-17-hydroxy-21-acyloxy-pregnadiene as for example $\Delta^{4,7}$-3,11,20-triketo-17-hydroxy-21-alkanoyloxy-pregnadiene, $\Delta^{4,7}$-3,11,20-triketo-17-hydroxy-21-acetoxy-pregnadiene, $\Delta^{4,7}$-3,11,20-triketo-17-hydroxy-21-propionoxy-pregnadiene, $\Delta^{4,7}$-3,11,20-triketo-17-hydroxy-21 benzoxy-pregnadiene, and the like. These $\Delta^{4,7}$-3,11,20-triketo-17-hydroxy-21-acyloxy-pregnadienes are reacted with a hydrolyzing agent such as sodium methoxide in methanol to produce $\Delta^{4,7}$-3,11,20-triketo-17,21-dihydroxy-pregnadiene.

propionoxy-pregnadiene, $\Delta^{4,7}$-3,11,20-triketo-17-hydroxy-

The $\Delta^{4,7}$-3,11,20-triketo-17,21-dihydroxy-pregnadiene is reacted with semicarbazide to form $\Delta^{4,7}$-3,11,20-triketo-17,21-dihydroxy-pregnadiene 3,20-bis-semicarbazone which is reacted with an alkali metal borohydride, preferably lithium borohydride under anhydrous conditions, to produce $\Delta^{4,7}$-3,20-diketo-11,17,21-trihydroxy-pregnadiene 3,20-bis-semicarbazone. The later compound is then reacted with an aqueous mineral acid solution in contact with a water-immiscible solvent such as chloroform to form $\Delta^{4,7}$-3,20-diketo-11,17,21-trihydroxy-pregnadiene, which is reacted with an acylating agent, for example a lower alkanoic anhydride to produce $\Delta^{4,7}$-3,20-diketo-11,17-dihydroxy-21-acyloxy-pregnadiene such as $\Delta^{4,7}$-3,20-diketo-11,17-dihydroxy-21-alkanoyloxy-pregnadiene, $\Delta^{4,7}$-3,20-diketo-11,17-dihydroxy-21-acetoxy-pregnadiene, $\Delta^{4,7}$-3,20-diketo-11,17-dihydroxy-21-propionoxy-pregnadiene, $\Delta^{4,7}$-3,20-diketo-11,17-dihydroxy-21-benzoxy-pregnadiene, and the like.

The following examples illustrate methods of carrying out the present invention but it is to be understood that these examples are given for purposes of illustration and not of limitation.

Example 1

To a mixture of 25 parts of dry benzene and 1.95 parts of ethylene glycol is added 0.46 part of $\Delta^{4}$-3,11,20-triketo-17-hydroxy-21-acetoxy-pregnene and 0.03 part of p-toluene sulfonic acid monohydrate. This solution is heated under reflux for about 20 hours during which time the water formed by the reaction is removed by azeotropic distillation. The reaction mixture is cooled to room temperature and the acid catalyst is neutralized by the addition of 0.06 part of pyridine. The benzene solution is washed with 25 parts of water, and the water wash is reextracted twice with ether. The combined benzene and ether extracts are washed with water, with saturated aqueous sodium chloride solution, dried over magnesium sulfate, filtered, and the solvents evaporated in vacuo. The residual material is purified by recrystallization from ether-petroleum-ether, following a chromatographic purification step if desired, to give $\Delta^{5}$-3-ethylenedioxy-11,20-diketo-17-hydroxy-21-acetoxy-pregnene.

A solution of 3.60 parts of $\Delta^{5}$-3-ethylene-dioxy-11,20-diketo-17-hydroxy-21-acetoxy-pregnene is dissolved in carboin tetrachloride, 1.87 parts of N-bromo-succinimide is added, and the resulting mixture is heated under reflux for a period of approximately 20 minutes while illuminating the mixture with a photoflood light. At the end of this period, the photo-chemical reaction is interrupted, the reaction solution is cooled, and the cold solution is filtered to remove insoluble succinimide. The filtered solution is then evaporated in vacuo, methanol is added to the residual material, and the crystalline material is recovered from the slurry by filtration and purified by recrystallization from methanol (including a chromatographic purification over alumina if desired) to give substantially pure $\Delta^{5}$-3-ethylenedioxy-7-bromo-11,20-diketo-17-hydroxy-21-acetoxy-pregnene.

1.7 parts of $\Delta^{5}$-3-ethylenedioxy-7-bromo-11,20-diketo-17-hydroxy-21-acetoxy-pregnene is mixed with 10 part of dimethylaniline, and the mixture is heated at about 90° C. for a period of about 2 hours. The reaction mixture is diluted with 100 parts of petroleum ether and 50 parts of benzene, and the resulting solution is washed successively with 1 N aqueous sulfuric acid, water, saturated aqueous sodium bicarbonate solution, and finally with water. The washed organic layer is dried, and the dried solution is evaporated in vacuo to give crude material which is purified by chromatography over acid-washed alumina to give substantially pure $\Delta^{5,7}$-3-ethylenedioxy-11,20-diketo-17-hydroxy-21-acetoxy-pregnadiene.

A solution of one part of $\Delta^{5,7}$-3-ethylenedioxy-11,20-diketo-17-hydroxy-21-acetoxy-pregnadiene in 2.6 parts of glacial acetic acid and 1 part of water is heated on the steam bath for 30 minutes. The resulting mixture is diluted with 25 parts of water, cooled, and the crude material which separates is extracted with ethyl acetate. The ethyl acetate extracts are washed with saturated aqueous sodium chloride solution, with 5% aqueous sodium bicarbonate solution and then with water. The ethyl acetate extract is dried, filtered and the solvent evaporated in vacuo. The residual material is chromatographed over alumina and recrystallized from acetone to give substantially pure $\Delta^{4,7}$-3,11,20-triketo-17-hydroxy-21-acetoxy-pregnadiene.

One part of $\Delta^{4,7}$-3,11,20-triketo-17-hydroxy-21-acetoxy-pregnadiene is dissolved in methanol containing one molecular equivalent of sodium methoxide, and the resulting solution is allowed to stand at room temperature for about 10 minutes. The hydrolysis reaction solution is diluted with water, and the precipitated material is recovered by filtration, dried, and purified by recrystallization from a mixture of ethyl acetate and ether to give substantially pure $\Delta^{4,7}$-3,11,20-triketo-17,21-dihydroxy-pregnadiene.

*Example 2*

A mixture of 0.5 parts of $\Delta^{4,7}$-3,11,20-triketo-17,21-dihydroxy-pregnadiene, 0.5 part of anhydrous sodium acetate, 0.62 part of semicarbazide hydrochloride and 35 parts of 95% ethanol is heated at a temperature of about 70° C. for about 3 hours. The reaction mixture is evaporated to small volume in vacuo, the concentrated solution is diluted with water, and the insoluble material which precipitates is recovered by filtration, washed with water and dried. The resulting material is acetylated and the resulting product is purified by recrystallization from alcohol to give substantially pure $\Delta^{4,7}$-3,11,20-triketo-17-hydroxy-21-acetoxy-pregnadiene 3,20-bis-semicarbazone.

To a suspension of 0.2 part of lithium borohydride in 10 parts of anhydrous tetrahydrofuran is added, dropwise with stirring over a 30-minute period, a solution of 0.44 part of $\Delta^{4,7}$-3,11-20-triketo-17-hydroxy-21-acetoxy-pregnadiene 3,20-bis-semicarbazone in 2.5 parts of dimethylformamide and 5 parts of tetrahydrofuran, while maintaining the reaction mixture at a temperature of about 25° C. The resulting mixture is stirred for an additional 40 minutes at 25° C., 20 parts of a 10% aqueous solution of acetic acid is added cautiously to the mixture thereby decomposing excess lithium borohydride. The clear solution is evaporated in vacuo nearly to dryness, the residual material is slurried with 10 parts of water, and the insoluble material is recovered by filtration, washed with water, and dried to give $\Delta^{4,7}$-3,20-diketo-11,17-dihydroxy-21-acetoxy-pregnadiene 3,20-bis-semicarbazone.

A mixture of 0.3 part of $\Delta^{4,7}$-3,20-diketo-11,17-dihydroxy-21-acetoxy-pregnadiene 3,20-bis-semicarbazone, 5 parts of glacial acetic acid, 1.5 parts of water, 0.85 part of sodium acetate, and 0.8 part of 90% aqueous pyruvic acid is heated under nitrogen for 4 hours at about 75° C. The reaction mixture is diluted with 20 parts of water, and the aqueous mixture is evaporated nearly to dryness in vacuo. The residual material is slurried with water, and the organic material is extracted with ethyl acetate. The ethyl acetate solution is washed until neutral, dried, decolorized, and evaporated to small volume. Upon cooling the resulting concentrate, a crystalline material separates which is recovered by filtration and purified by chromatography followed by recrystallization from ethyl acetate to give substantially pure $\Delta^{4,7}$-3,20-diketo-11,17-dihydroxy-21-acetoxy-pregnadiene.

One part of $\Delta^{4,7}$-3,20-diketo-11,17-dihydroxy-21-acetoxy-pregnadiene is dissolved in methanol containing one molecular equivalent of sodium methoxide, and the resulting solution is allowed to stand at room temperature for about 10 minutes. The hydrolysis reaction solution is diluted with water, and the precipitated material is recovered by filtration, dried, and purified by recrystallization from a mixture of ethyl acetate and ether to give substantially pure $\Delta^{4,7}$-3,20-diketo-11,17,21-trihydroxy-pregnadiene.

Various changes and modifications may be made in carrying out the present invention without departing from the spirit and scope thereof. Insofar as these changes and modifications are within the purview of the annexed claims, they are to be considered as part of this invention.

I claim:

1. $\Delta^{4,7}$-3,20-diketo-17-hydroxy-11,21 - bis-oxygenated-pregnadienes having the following formula:

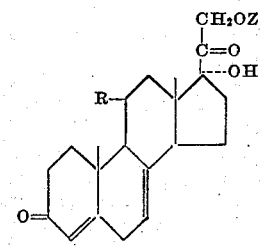

wherein R is a radical selected from the group which consists of hydroxy and keto radicals, and Z is a substituent selected from the group which consists of hydrogen and lower hydrocarbon carbonyl substituents.

2. $\Delta^{4,7}$-3,11,20-triketo-17-hydroxy-21-lower hydrocarbon carbonyloxy-pregnadiene.

3. $\Delta^{4,7}$-3,11,20-triketo-17$\alpha$-hydroxy-21-acetoxy - pregnadiene.

4. $\Delta^{4,7}$-3,11,20-triketo-17$\alpha$,21-dihydroxy-pregnadiene.

5. $\Delta^{4,7}$-3,20-diketo-11,17-dihydroxy-21-lower hydrocarbon carbonyloxy-pregnadiene.

6. $\Delta^{4,7}$-3,20-diketo-11$\beta$,17$\alpha$ - dihydroxy - 21 - acetoxy-pregnadiene.

7. $\Delta^{4,7}$-3,20-diketo-11$\beta$,17$\alpha$,21-trihydroxy-pregnadiene.

8. The process which comprises reacting an N-bromamide with a 3-lower ketal of $\Delta^{4}$-3,11,20-triketo-17-hydroxy-21-lower hydrocarbon carbonyloxy-pregnene to form the corresponding 7-bromo derivative, and reacting the latter compound with a tertiary amine followed by a mild hydrolyzing agent to produce $\Delta^{4,7}$-3,11,20-triketo-17-hydroxy-21-lower hydrocarbon carbonyloxy-pregnadiene.

9. The process which comprises reacting N-bromosuccinimide with $\Delta^{5}$-3-ethylenedioxy-11,20-diketo-17$\alpha$-hydroxy-21-acetoxy-pregnene to form $\Delta^{5}$-3-ethylenedioxy-7-bromo-11,20-diketo-17$\alpha$ - hydroxy - 21 - acetoxy - pregnene, and reacting the latter compound with collidine to produce $\Delta^{5,7}$-3-ethylenedioxy-11,20-diketo-17$\alpha$ - hydroxy-21-acetoxy-pregnadiene.

10. The process which comprises reacting an N-bromamide with a 3-lower ketal of $\Delta^{4}$-3,11,20-triketo-17-hydroxy-21-lower hydrocarbon carbonyloxy-pregnene to form the 7-bromo-derivative.

11. The process which comprises reacting N-bromosuccinimide with $\Delta^{5}$-3-ethylenedioxy-11,20-diketo-17$\alpha$-hydroxy-21-acetoxy-pregnene to form $\Delta^{5}$-3-ethylene-dioxy-7-bromo-11,20-diketo - 17$\alpha$ - hydroxy - 21 - acetoxy-pregnene.

12. The process which comprises reacting a tertiary amine with the 7-bromo derivative of $\Delta^{4}$-3,11,20-triketo-17-hydroxy-21-lower hydrocarbon carbonyloxy-pregnene 3-ketal to produce the corresponding $\Delta^{4,7}$-3,11,20-triketo-17-hydroxy-21-lower hydrocarbon carbonyloxy-pregnadiene 3-ketal.

13. The process which comprises reacting $\Delta^{5}$-3-ethylenedioxy-7-bromo-11,20-diketo-17$\alpha$ - hydroxy - 21 - acetoxy-pregnene with collidine to produce $\Delta^{5,7}$-3-ethylenedioxy-11,20-diketo-17$\alpha$-hydroxy-21-acetoxy-pregnadiene.

14. The process which comprises reacting $\Delta^{4,7}$-3,11,20-triketo-17,21-dihydroxy-pregnadiene with semicarbazide to form $\Delta^{4,7}$-3,11,20-triketo-17,21-dihydroxy-pregnadiene 3-20-bis-semicarbazone, reacting this 3,20-bis-semicarbazone with an alkali metal borohydride to produce $\Delta^{4,7}$-3,20-diketo-11,17,21-trihydroxy-pregnadiene 3,20-bis-semicarbazone, and reacting the later compound with a hydrolyzing agent thereby forming $\Delta^{4,7}$-3,20-diketo-11,17,21-trihydroxy-pregnadiene.

15. The process which comprises reacting $\Delta^{4,7}$-3,11,20-triketo-17,21-dihydroxy-pregnadiene with semicarbazide to form $\Delta^{4,7}$-3,11,20-triketo-17,21-dihydroxy-pregnadiene 3,20-bis-semicarbazone.

16. The process which comprises reacting $\Delta^{4,7}$-3,11,20-triketo-17,21-dihydroxy-pregnadiene 3,20-bis-semicarbazone with an alkali metal borohydride to produce $\Delta^{4,7}$-3,20-diketo-11,17,21-trihydroxy-pregnadiene 3,20-bis-semicarbazone.

17. The process which comprises reacting $\Delta^{4,7}$-3,11,20-triketo-17$\alpha$,21-dihydroxy-pregnadiene 3,20-bis-semicarbazone with sodium borohydride to produce $\Delta^{4,7}$-3,20-diketo-11$\beta$,17$\alpha$,21-trihydroxy-pregnadiene 3,20-bis-semicarbazone.

References Cited in the file of this patent

UNITED STATES PATENTS

| | | |
|---|---|---|
| 2,409,798 | Reichstein | Oct. 22, 1946 |
| 2,734,897 | Chemerda | Feb. 14, 1956 |
| 2,740,797 | Laubach | Apr. 3, 1956 |

FOREIGN PATENTS

| | | |
|---|---|---|
| 1,052,936 | France | Sept. 30, 1953 |

OTHER REFERENCES

Rosenkranz: J. Org. Chem., 16, 290–1951.
Bide et al.: J. Chem. Soc., page 1783 (1948).